US006094132A

United States Patent [19]

Kramer

[11] Patent Number: 6,094,132

[45] Date of Patent: Jul. 25, 2000

[54] SYSTEM FOR MONITORING DRIVELINE SPINOUT CONDITIONS

[75] Inventor: Dennis A. Kramer, Troy, Mich.

[73] Assignee: Meritor Heavy Vehicle Systems, LLC, Troy, Mich.

[21] Appl. No.: 09/226,589

[22] Filed: Jan. 6, 1999

[51] Int. Cl.[7] ........ B60Q 1/00

[52] U.S. Cl. ........ 340/440; 340/439; 340/441; 180/249; 180/250; 701/82; 701/90

[58] Field of Search ........ 340/440, 438, 340/439, 441; 364/146; 180/248, 249, 250; 701/82, 88, 90, 91, 71, 75

[56] References Cited

U.S. PATENT DOCUMENTS

| | | | |
|---|---|---|---|
| 4,280,583 | 7/1981 | Stieg | 180/250 |
| 4,467,886 | 8/1984 | DeClaire et al. | 180/197 |
| 4,937,750 | 6/1990 | Gilliam | 364/424.1 |
| 5,016,724 | 5/1991 | Steinhagen et al. | 180/197 |
| 5,065,835 | 11/1991 | Richter et al. | 180/197 |
| 5,301,769 | 4/1994 | Weiss | 180/249 |
| 5,582,263 | 12/1996 | Varma et al. | 180/247 |
| 5,897,601 | 4/1999 | Suzuki | 701/78 |

*Primary Examiner*—Daniel J. Wu
*Assistant Examiner*—Toan Pham
*Attorney, Agent, or Firm*—Howard & Howard

[57] ABSTRACT

A system for monitoring spinout conditions in a heavy vehicle driveline provides the ability to monitor the manner in which a driver operates a vehicle. For example, spin out conditions that occur with greater frequency than is normally expected indicates an inappropriate manner of operating the vehicle. Similarly, spinouts that have relatively excessive duration indicate inappropriate vehicle operation. The system includes a sensor device for detecting a spinout condition and a detector for detecting whether a differential lock has been engaged by the vehicle operator. An electronic controller gathers information from the sensor device and the detector and records information regarding each spinout including the frequency and duration. This information is then later provided to a service technician to determine whether the vehicle warranty provisions have been violated.

20 Claims, 1 Drawing Sheet

SYSTEM FOR MONITORING DRIVELINE SPINOUT CONDITIONS

BACKGROUND OF THE INVENTION

This invention generally relates to a system for monitoring driveline spinout conditions and, more particularly, to a system that provides information for determining whether a vehicle operator is operating the vehicle driveline in an abusive manner.

A variety of sensors and detectors are available for monitoring the performance and condition of various components of the driveline in heavy vehicles. Examples of such sensors include those that detect oil temperature, axle load and oil pressure. In most situations, the sensor output is provided to a vehicle operator through a gage that is mounted on an instrument panel in the vehicle.

Although a variety of sensors are available, their capabilities are not necessarily fully exploited because under most circumstances they are considered in isolation.

Additionally, conventional sensor arrangements do not provide the ability to monitor certain fault conditions that occur while a vehicle is in operation. An example is a spinout condition when a vehicle begins moving after having been stopped. During a stop from start operation, it is possible to spinout the interaxle differential if the differential is not locked. This is particularly true under circumstances where one wheel is on a surface having a relatively low coefficient of friction. Currently available sensors do not permit appropriate monitoring of spinout conditions.

Occasional spinout for a short time period is typically not a problem. Repeated spinouts or spinning for extended periods of time, however, present the likelihood that the driveline will need repair. Moreover, repeated spinouts or spinning for extended periods of time typically indicates a driver abuse problem. Experienced heavy vehicle operators know that locking the differential typically eliminates a spinout problem. Inexperienced or careless drivers, however, will not bother to lock the differential to avoid a spinout.

It is useful to provide an arrangement for monitoring spinout conditions to enhance a driver's ability to operate a heavy vehicle. Additionally, monitoring spinout conditions can prove effective to determine when a particular driver is operating the vehicle in a manner that would void a warranty provision, for example.

SUMMARY OF THE INVENTION

In general terms, this invention is a system for monitoring spinouts in a vehicle driveline having a differential lock. The system includes a sensor device that detects a spinout condition. A switch is manually operable by a vehicle operator to place the differential lock into a locked condition. A differential lock detector is provided to detect whether the differential lock is in fact in the locked condition. An electronic controller has a preselected threshold value stored in a memory portion that is indicative of excessive spinout conditions. The electronic controller communicates with the sensor device, the switch and the differential lock detector to determine when a spinout condition exists. The electronic controller determines a length of time of the spinout condition and determines whether the vehicle operator has utilized the switch to place the differential lock into a locked condition to avoid the spinout. The electronic controller preferably also determines the frequency with which a driver experiences spinout conditions. The electronic controller provides an output whenever the threshold value has been exceeded.

In the preferred embodiment, the output of the electronic controller provides an indication to the driver that the differential lock should be engaged to avoid or minimize the spinout condition. The output of the electronic controller preferably also includes a warning to the driver that the preselected threshold has been exceeded, thereby indicating that the driver is not properly operating the differential lock and is violating warranty provisions. Additionally, the output of the electronic controller preferably provides an indication which preferably is only accessible by a service technician that the vehicle has been operated in a manner that violates warranty provisions.

The various features and advantages of this invention will become apparent to those skilled in the art from the following detailed description of the currently preferred embodiment. The drawings that accompany the detailed description can be briefly described as follows.

DETAILED DESCRIPTION OF THE PREFERRED EMBODIMENT

Figure 1:
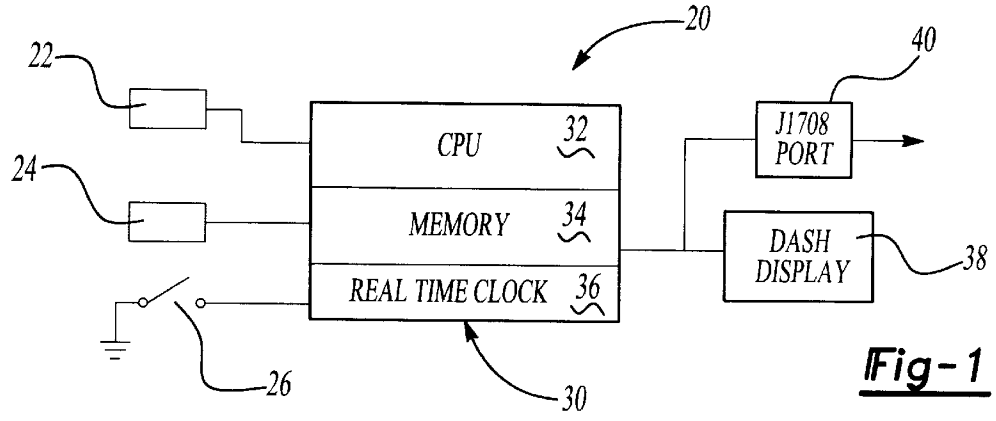
FIG. 1 schematically illustrates a system designed according to this invention.

FIG. 1 schematically illustrates a diagnostic system 20 for monitoring spinout conditions on a vehicle. The system 20 is particularly suited for heavy vehicles, such as trucks, that have a differential lock associated with the driveline to avoid spinout conditions. As will be understood by those skilled in the art, a differential lock is typically placed into a locked condition based upon a manual input from the vehicle operator.

The system 20 includes a sensor device 22 that detects a spinout condition. The sensor device 22 can take one of several forms provided that it is capable of supplying the necessary information to indicate when a spinout condition occurs. In one example, the sensor device 22 includes a driveline speed sensor and wheel speed sensors. In another example, the sensor device 22 includes a driveline input speed sensor and a driveline output speed sensor. In either situation, the differing speeds provided by the two sensors of the sensor device 22 indicate when a spinout condition occurs. Additionally, the output speed of the driveline can be determined by monitoring wheel and speed and utilizing average wheel speed and the differential gear ratio.

A differential lock detector 24 detects when the differential lock is in a locked condition. The components of the sensor device 22 and the differential lock detector preferably are commercially available components. Given this description, those skilled in the art will be able to choose from among commercially available components to meet the needs of a particular situation. For example, the wheel speed sensors can be the same type used on anti-lock brake systems currently on vehicles. Similarly, a position switch appropriately associated with the differential locking mechanism can serve as the detector 24.

A manually operable switch 26 preferably is positioned within a cab portion of the vehicle so that the vehicle operator can selectively engage the differential lock mechanism. The switch 26 preferably is a conventional device as currently supplied on heavy vehicles for selectively engaging a differential lock.

An electronic controller 30 includes a central processing unit 32 that communicates with the sensor device 22, the detector 24 and the switch 26. The electronic controller 30 utilizes the information from the sensor device 22 to determine when a spinout condition exists. The electronic controller 30 preferably also determines a length of time that a spinout condition exists and monitors when the condition occurs including tracking the mileage on the vehicle odometer. The electronic controller 30 preferably also tracks how often spinout conditions exist to determine the frequency with which spinout conditions occur.

The electronic controller preferably also monitors the position of the differential lock by communicating with the detector 24 and the position of the switch 26 to determine whether the vehicle operator is appropriately choosing to engage the differential lock to avoid a spinout condition.

The electronic controller preferably also includes a memory module 34 and a real time clock 36. Those skilled in the art will appreciate that the memory module 34 and the real time clock 36 are only schematically shown as individual portions for purposes of illustration and discussion and that no physical separation between them need be present within a microprocessor utilized as the electronic controller 30. The system 20 preferably includes a display 38 positioned within the vehicle. The display 38 preferably provides a visible indication to the driver when the differential lock should be engaged to avoid or minimize a spinout condition. Additionally, the display 38 preferably is reconfigurable so that the driver is provided with information regarding the operation of the differential lock, whether it is functioning properly and when the driver is operating the vehicle in an "abusive" manner, which may violate certain warranty provisions.

Additionally, the system 20 preferably includes a communication port 40 such as an SAE J1708/J1587 data bus to provide communication between the electronic 30 and a separate computer device (not illustrated). The communication port 40 facilitates monitoring whether a driver is operating the vehicle in a manner that violates warranty provisions so that a service technician can be properly advised of the situation.

Figure 2:
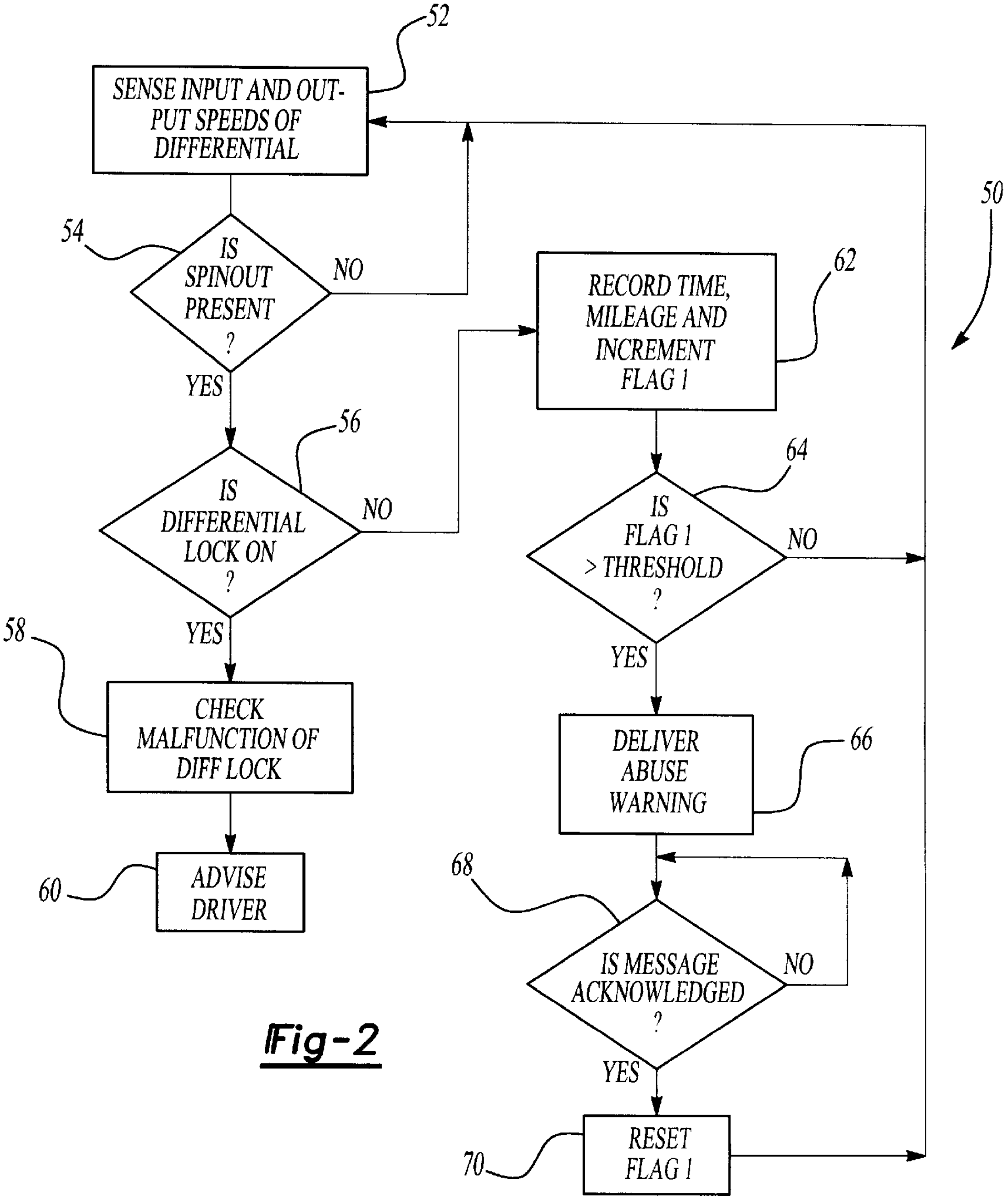
FIG. 2 is a flow chart diagram illustrating the preferred method of this invention.

FIG. 2 schematically illustrates the preferred method of operating the system 20. The flow chart 50 includes a first step at 52 where the electronic controller 30 receives the information from the sensor device 22. As mentioned above, in one example, the input and output speeds of the driveline are compared to determine whether a spinout condition is present. The determination of whether the spinout condition exists is made at 54. If there is no spinout condition, then the electronic controller 30 continues to receive information from the sensor device 22.

When the information from the sensor device indicates that a spinout condition exists, the electronic controller 30 determines at 56 whether the differential lock is engaged by receiving information from the differential lock detector 24 and the switch 26. In the event that the switch 26 has been activated (i.e., the driver has requested that the differential lock be engaged into a locked condition) and the differential lock is not engaged, the system determines that the differential lock is malfunctioning at 58. The system preferably provides an indication to the driver at 60 that the differential lock is not operating as intended.

If the driver has not requested that the differential lock be engaged then the system records the occurrence of the spinout, the length of time of the spinout and the current mileage on the odometer of the vehicle. This information then preferably is stored in the memory module 34 of the electronic controller 30. Additionally, a flag value is incremented to provide the ability to track the driver's operation of the vehicle over time. A decision is made at 64 whether the flag value exceeds a preselected threshold. In one example the flag value indicates the frequency of spinout conditions. In other words, the electronic controller 30 determines how often a spinout condition occurs and, if they occur with a frequency greater than a preselected maximum, the threshold has been exceeded and a warning is provided to the driver at 66. The warning preferably indicates that the driver is operating the vehicle in an inappropriate manner and that warranty provisions potentially have been violated.

When the threshold value has been exceeded the system preferably also provides a message that can only be accessed by a service technician. At 68, the system determines whether that message has been acknowledged by a service technician and maintains the current flag value or other information indicating the driver's manner of operating the vehicle until that message is acknowledged through the communication port 40, for example. After a service technician has been advised, the flag value is reset at 70.

Even though the flag value is incremented each time a spinout condition occurs, for example, since some spinouts are to be expected under normal operation, the system repeatedly tracks spinout conditions until the threshold value is exceeded before it provides any indication to the driver or a service technician.

Although the threshold value discussed above included the frequency of occurrence of spinout conditions, another example threshold value is when spinout conditions exist for excessive amounts of time during each spinout. Therefore, separate threshold values may be utilized to monitor the frequency of spinouts and the duration of each spinout or a combined threshold value can be used, depending on the needs of a particular situation. Given this description, those skilled in the art will be able to develop the software necessary to program a conventional microprocessor to realize the functions of the electronic controller to accomplish the method of this invention.

The description just given provides an example implementation of this invention. Variations and modifications may become apparent to those skilled in the art that do not necessarily depart from the purview and spirit of this invention. The scope of legal protection given to this invention can only be determined by studying the following claims.

What is claimed is:

1. A system for monitoring spinouts in a vehicle driveline having a differential lock, comprising:

a sensor device that detects a spinout condition;

a switch that is manually operable by a vehicle operator to place the differential lock into a locked condition;

a differential lock detector that detects whether the differential lock is in the locked condition; and an electronic controller that has a preselected threshold value indicative of excessive spinout conditions, wherein the electronic controller communicates with the sensor device, the switch and the detector and determines whether the differential lock switch has been utilized to minimize a spinout condition and provides an output when the threshold value has been exceeded.

2. The system of claim 1, wherein the sensor device comprises a wheel speed sensor and a driveline speed sensor.

3. The system of claim 1, wherein the sensor device comprises a driveline input speed sensor and a driveline output speed sensor.

4. The system of claim 1, wherein the differential lock detector comprises a switch positioned to be activated responsive to movement of the differential lock into the locked condition.

5. The system of claim 1, wherein the electronic controller determines a length of time of a spinout condition, the preselected threshold includes a maximum time for a spinout condition and the electronic controller determines whether the length of time of a spinout condition exceeds the maximum time.

6. The system of claim 1, wherein the electronic controller determines a frequency of occurrence of spinout conditions, the preselected threshold includes a maximum frequency of occurrences of spinout conditions and the electronic controller determines whether the determined frequency of spinout conditions exceeds the maximum frequency.

7. The system of claim 1, wherein the electronic controller output includes an indication to the vehicle operator that the differential lock should be engaged to avoid a spinout condition.

8. The system of claim 1, wherein the electronic controller output includes an indication to the vehicle operator that the preselected threshold has been exceeded.

9. The system of claim 8, wherein the electronic controller output includes an indication that is accessible by a service technician that the preselected threshold has been exceeded.

10. A method of monitoring spinout conditions in a vehicle driveline having a differential lock that is selectively operable by a vehicle operator, comprising the steps of:

(A) determining when a spinout condition exists;

(B) determining whether the vehicle operator has manually caused the differential lock to be engaged;

(C) determining a length of time that the spinout condition exists; and (D) determining whether the length of time from step (C) exceeds a preselected threshold value when the vehicle operator has not manually caused the differential lock to be engaged.

11. The method of claim 10, further comprising providing an output indicating when the threshold value has been exceeded.

12. The method of claim 10, further comprising determining a frequency of occurrence of spinout conditions and determining whether the frequency exceeds a predetermined frequency threshold value and providing an output indicating when the threshold has been exceeded.

13. The method of claim 12, further comprising providing an output that is only accessible by a vehicle service technician that indicates that the preselected time threshold has been exceeded or that the predetermined frequency exceeds the predetermined threshold.

14. The method of claim 10, wherein step (A) is performed by detecting a wheel speed and a driveline speed and utilizing the detected speeds to determine whether a spinout condition exists.

15. The method of claim 10, wherein step (A) is performed by detecting an input speed and an output speed of the driveline and utilizing the detected input and output speeds to determine whether a spinout condition exists.

16. The method of claim 10, further comprising providing an indication to the vehicle operator when the differential lock should be engaged to avoid a spinout condition.

17. The method of claim 15, further comprising providing an output that is accessible by a service technician indicating that the preselected threshold has been exceeded.

18. The method of claim 10, further comprising providing an output indicating a malfunction in the differential lock when it is determined that the vehicle operator has engaged the differential lock but the differential lock is not in the engaged condition.

19. The method of claim 10, including providing an indication to the vehicle operator to manually cause the differential lock to be engaged.

20. The method of claim 10, wherein step (B) includes determining whether the operator has manually manipulated a switch.

* * * * *